United States Patent [19]

Knopp et al.

[11] Patent Number: 5,377,942
[45] Date of Patent: Jan. 3, 1995

[54] COLUMN UNIT

[75] Inventors: Axel Knopp, Eitelborn; Andreas Binder, Kobern-Gondorf; Hans-Josef Hosan, Neuwied; Castor Fuhrmann, Brachtendorf, all of Germany

[73] Assignee: Stabilus GmbH, Koblenz-Neuendorf, Germany

[21] Appl. No.: 240,605

[22] Filed: May 10, 1994

Related U.S. Application Data

[63] Continuation of Ser. No. 783,984, Oct. 29, 1991, abandoned.

[30] Foreign Application Priority Data

Oct. 31, 1990 [DE] Germany ............... 4034633

[51] Int. Cl.⁶ ............................................. F16M 11/00
[52] U.S. Cl. ......................................... 248/161; 248/631
[58] Field of Search ............ 248/161, 404, 631, 188.5; 297/345; 108/144, 150

[56] References Cited

U.S. PATENT DOCUMENTS

| | | | |
|---|---|---|---|
| 3,788,587 | 1/1974 | Stemmler | 248/404 X |
| 4,692,057 | 9/1987 | Lauderbach | 248/161 X |
| 4,756,496 | 7/1988 | Hosan et al. | 248/161 |
| 4,969,619 | 11/1990 | Bauer et al. | 248/161 |
| 5,114,109 | 5/1992 | Fitz et al. | 248/161 X |
| 5,234,187 | 8/1993 | Teppo et al. | 248/161 |

FOREIGN PATENT DOCUMENTS

| | | | |
|---|---|---|---|
| 511500A1 | 4/1992 | European Pat. Off. | |
| 426360 | 3/1926 | Germany | 248/161 |
| 621149 | 11/1935 | Germany | |
| 2603488 | 8/1977 | Germany | 248/161 |

OTHER PUBLICATIONS

Suspa Compart Produktinformation, available in Interzum '91 trade show (May 1991).

Primary Examiner—Ramon O. Ramirez
Attorney, Agent, or Firm—Brumbaugh, Graves, Donohue & Raymond

[57] ABSTRACT

According to an illustrative example of the invention, a chair column comprises a base tube with a support plate. A gas spring is accommodated within the base tube. The piston rod of the gas spring is supported on the base tube by a ball bearing. The cylinder of the gas spring is guided at the upper end of the base tube by a guiding sleeve. The guiding sleeve is telescopical with respect to the base tube in response to outward and inward movement of the cylinder with respect to the base tube such that a full satisfactory guiding function is maintained between the cylinder and the base tube, even when the cylinder is in its uppermost position.

38 Claims, 3 Drawing Sheets

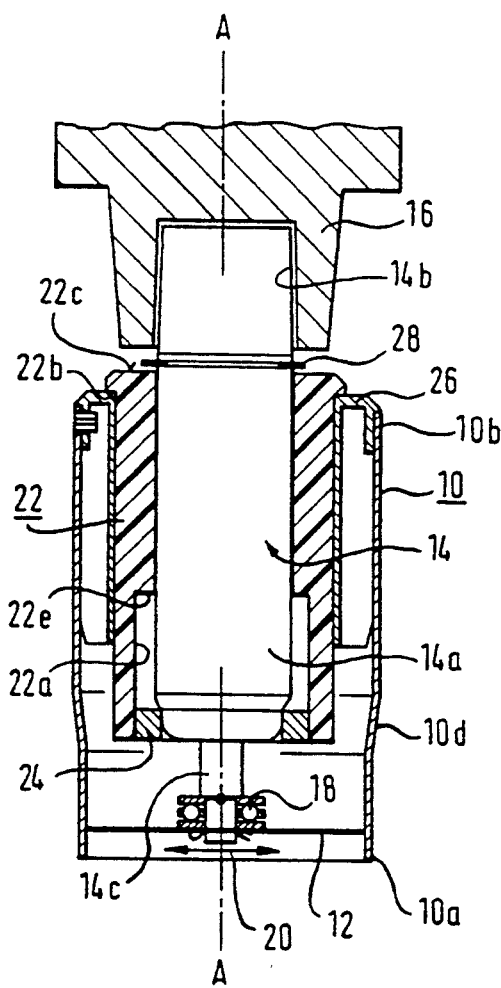
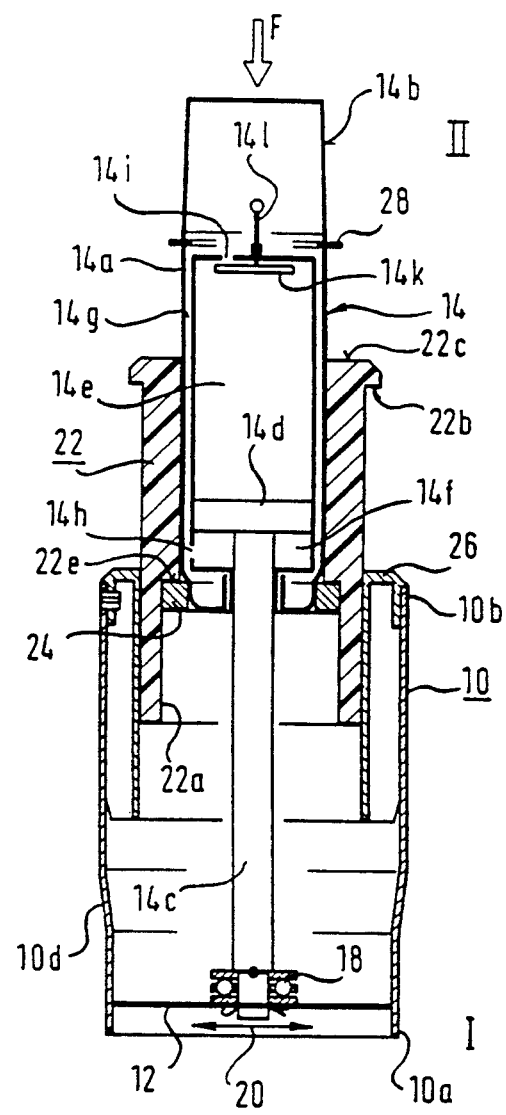
Fig. 1
Fig. 2

COLUMN UNIT

This application is a continuation of application Ser. No. 07/783,984, filed on Oct. 29, 1991, now abandoned.

BACKGROUND OF THE INVENTION

Column units of the type described hereinafter are frequently used as chair columns. They have to fulfill the function of allowing height adjustment of a seat face and rotation of the seat face with respect to a base frame.

STATEMENT OF THE PRIOR ART

From German Patent 19 31 012 and U.S. Pat. No. 4,848,524 chair columns are known. These chair columns comprise a base tube connectable with a base frame, which base frame is provided with rollers rolling on a floor. A gas spring is provided within the base tube. The gas spring comprises a cylinder and a piston rod. The piston rod is provided with a piston within the cylinder. The cylinder is filled with a pressurized gas on both sides of the piston. A bypass interconnects the chambers within the cylinder on both sides of the piston. A locking valve is allocated to the bypass. When the locking valve is open, the piston rod is pushed out of the cylinder by the pressurized gas acting onto the cross-section of the piston rod. By an axial load, the piston rod can be pushed inwards of the cylinder against the pressure of the pressurized gas acting onto the cross-sectional area of the piston rod. By closing the locking valve, the relative position of the cylinder and the piston rod can be locked in any desired relative position. The piston rod is supported on a base plate of the stand tube by an axial load transmitting ball bearing, such as to be rotatable with respect to the stand tube. The cylinder of the gas spring is guided within a guide sleeve inserted into the upper end of the stand tube. The cylinder is slidable and rotatable with respect to the guide sleeve. The upper end of the cylinder is provided with a conical fastening section. A seat carrier having a complementary conical hole can be fixed on this conical fastening section. A locking control pin extends through the upper end of the cylinder for opening and closing the bypass.

The lower end of the piston rod is laterally movable with respect to the base plate. In order to warrant a satisfactory guiding function, between the cylinder and the stand tube, a limited upward movement of the cylinder with respect to the base plate is allowed, such that the stroke of height adjustment is limited.

From European Patent 133 524 a further similar construction is known, in which the cylinder is enclosed by a housing, and the housing is provided with the conical fastening section.

From German Patent 15 29 723 a further chair column is known. A base tube is again fastened to a chair base. An inner telescopic tube is guided within the stand tube. The inner telescopic tube is closed at its upper end, and a seat plate is fastened to the closed upper end. A gas spring is housed within the base tube and the telescopic tube. The cylinder of the gas spring is rigidly fastened by its bottom to a bottom wall of the stand tube. The piston rod of the gas spring carries at its upper end a rope pulley. A rope is guided from the base plate of the stand tube around this pulley to the lower end of the inner telescopic tube. Locking means are provided for locking the movement of the telescopic innertube with respect to the stand tube. The cylinder, the piston rod and the pulley have no lateral engagement with the telescopic tube. On upward movement of the piston rod with respect to the cylinder, the pulley is lifted and the inner telescopic tube is also lifted. The lifting velocity of the inner telescopic tube is greater than the lifting velocity of the piston rod. Such, the stroke of the inner telescopic tube is larger than the stroke of the piston rod. Rotation of the seat plate with respect to the seat base is limited if possible at all. The provision of a locking control element at the upper end of the gas spring is impossible due to the presence of the rope pulley.

OBJECT OF THE INVENTION

It is an object of the present invention to provide a column unit which allows an increasedheight adjustment stroke while maintaining a perfect guiding function even in the position of maximum stroke. A further object of the invention is to allow a perfect rotation of a seat member or the like with respect to the base tube. A further object of the invention is to provide a column unit which allows a locking element to be provided at the upper end of the column unit.

A further object of the invention is to provide a simple and operationally reliable and compact design.

SUMMARY OF THE INVENTION

A column unit comprises a base tube having a base tube axis, a first base tube end and a second base tube end. Guiding means are inserted into the base tube adjacent the second base tube end. A positioning device having a device axis substantially coinciding with the base tube axis is accommodated within the base tube. This positioning device has a first device component unit and a second device component unit. The first and the second device component units are axially movable with respect to each other and are substantially lockable with respect to each other in a plurality of relative axial positions. The first device component unit is axially supported by device support means and rotatable with respect thereto. The second device component unit extends beyond the second base tube end and the guiding means. An outer portion of the second device component unit extends beyond the second base tube end and the guiding means and is adapted for connection with a column-guided part. The second device component unit is in axially sliding guiding engagement with the guiding means.

The guiding means are axially slidingly guided along the base tube with respect to the second base tube end in response to relative axial movement of the first and second device component units, such as to be moved axially outwards of the base tube with respect to the second base tube end in response to axially outward movement of the second device component unit out of the base tube with respect to the second base tube end, and to be axially moved inwards into the base tube with respect to the second base tube end in response to axially inward movement of the second device component unit into the base tube with respect to the second base tube end.

With such a column unit, the maximum stroke of the positioning device can be increased without deteriorating the guiding function between the stand tube and the second device component unit, because the guiding means follow the axial movement of the second device component unit.

According to a most simple and economic design, the guiding means are entrainable with the second device component unit in at least one axial direction of movement by frictional engagement of the second device component unit and the guiding means, or the guiding means are entrainable by the second device component unit in at least one axial direction by abutment means. Moreover gravity forces may be used for moving the guiding means in downward direction. A most reliable design is obtained, if the guiding means are entrainable by the second device component unit in both axial directions through respective abutment means, said respective abutment means permitting axially relative movement of the second device component unit and the guiding means.

E. g., the second device component unit may be provided with a first abutment ring, which is accommodated within a radial inner annular recess of a guiding sleeve. This annular recess has a substantially axially directed end face. The first abutment ring is engageable with this end face for entraining the guiding sleeve in a direction outwards of the base tube with respect to the second end of the base tube.

The second device component unit may be provided with a second abutment member engageable with the guiding means for entraining said guiding means inwards of the base tube with respect to the second base tube end. This second abutment member may be provided by a column-guided part, e. g. a chair plate, fastened to the second device component unit.

The guiding means may be centered within the base tube by a centering tube. The centering tube may be fixed against rotation about the base tube axis with respect to the base tube.

The guiding means may be fixed against rotation with respect to the base tube.

The base tube may be provided with a stop face limiting inward movement of the guiding means inwards of the base tube.

The guiding means may be at least partially made of a plastics material, e. g. in the form of a guiding sleeve.

The device support means may be provided inside the base tube.

The second device component unit may be provided at an axial end thereof remote from the device support means with locking control means.

The device support means may be axially fixed with respect to the base tube. This is particularly true for those possible embodiments of the invention in which the guiding means are moved by the second device component unit through friction means or abutment means.

Alternatively, the device support means may be axially movable with respect to the base tube. More particularly, the device support means may be axially movable with respect to the base tube in response to relative axial movement of the first and the second device component units.

The axial movement of the device support means may be controlled in response to relative axial movement of the first and second device component units through tackle means. By tackle means one has to understand a combination of at least one flexible tension member and a pulley.

The device support means may be movable with respect to the base tube against elastic resistance in response to axial load on the positioning device. Such, a certain spring effect of a seat plate may be obtained.

A very simple and reliable embodiment with axially movable device support means may be obtained, if the axial movement of the device support means is controlled in response to relative axial movement of the first and the second device component units by at least one flexible tension member running from a first anchoring point of the second device component unit via at least one pulley mounted on the device support means towards a second anchoring point on the base tube, said guiding means being axially movable together with said device support means. In such an embodiment, the outward movement of the second device component unit with respect to the base tube corresponds to 1.5 times the extension movement of the positioning device, whereas the outward movement of the guiding means corresponds to 0.5 times the extension movement of the positioning device.

In order to allow rotation of an object guided by the column unit, the positioning device may be rotatable about the base tube axis with respect to the device support means and with respect to the tackle means. More particularly, the first anchoring point may be rotatable with respect to the second device component unit about the base tube axis.

A plurality of flexible tension members may be provided. It is also possible that a common tension member follows a plurality of paths between said second device component unit, said device support means and said base tube.

The tackle means may comprise at least one elastically stretchable, flexible tension member. So, the device support means are movable in response to axial load against. elastic resistance. A similar effect may be obtained in that the tackle means comprise a flexible tension member having at least one end axially fixed to an elastically displaceable anchoring point.

The positioning device may comprise a cylinder piston device and more particularly a gas spring having a piston rod member and a cylinder member. In such case, the first device component unit may comprise the piston rod member, and the second device component unit may comprise the cylinder member. Alternatively, the first device component unit may comprise the cylinder member, and the second device component unit may comprise a guide tube axially fixed with respect to the piston rod member and guided within the guiding means.

According to a further aspect of the invention, a column unit comprises a base tube having a base tube axis, a first base tube end and a second base tube end. A positioning device having a device axis substantially coinciding with the base tube axis is inserted into the base tube. This positioning device has a first device component unit and a second device component unit. Said first and said second device component units are axially movable with respect to each other and are substantially lockable with respect to each other in a plurality of relative axial positions. The first device component unit is axially supported by device support means. The second device component unit extends beyond the second base tube end. An outer portion of the second device component unit extending beyond the second base tube end is adapted for connection with a column-guided part.

The device support means are axially movable with respect to the base tube in response to relative axial movement of the first and second device component units. More particularly, the axial movement of said device support means may be controlled in response to relative axial movement of the first and second device component units through tackle means.

The axial support means may be movable with respect to the base tube against elastic resistance in response to axial load on the positioning device.

According to a preferred embodiment, the axial movement of said device support means may be controlled in response to relative axial movement of the first and the second device component units by at least one flexible tension member running from a first anchoring point on said second device component unit via at least one pulley mounted on said device support means towards a second anchoring point on said base tube. With such an embodiment, axial outward movement of the second device component unit amounts to 1.5 times the axial extension of the positioning device.

The positioning device may be rotatable about the base tube axis with respect to the device support means and with respect to the tackle means.

Again, the positioning device may comprise a cylinder piston device having a piston rod member and a cylinder member. In such case, the first device component unit may comprise the piston rod member, and the second device component unit may comprise the cylinder member. Alternatively, the first device component unit may comprise the cylinder member, and the second device component unit may comprise the piston rod member. The cylinder piston device is e. g. a gas spring.

The column units of the present invention are particularly useful as vertical chair columns. Preferably, gas springs of the type as shown in U.S. Pat. No. 4,848,524 are used. A particular advantage is that the stroke of the gas spring may substantially correspond to the total length of the respective cylinder.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which FIG. 1 shows a first embodiment of a chair column in the lowermost position;

FIG. 2 shows the chair column of FIG. 1 in the uppermost position;

DETAILED DESCRIPTION OF THE PREFERRED EMBODIMENTS

Figure 3:
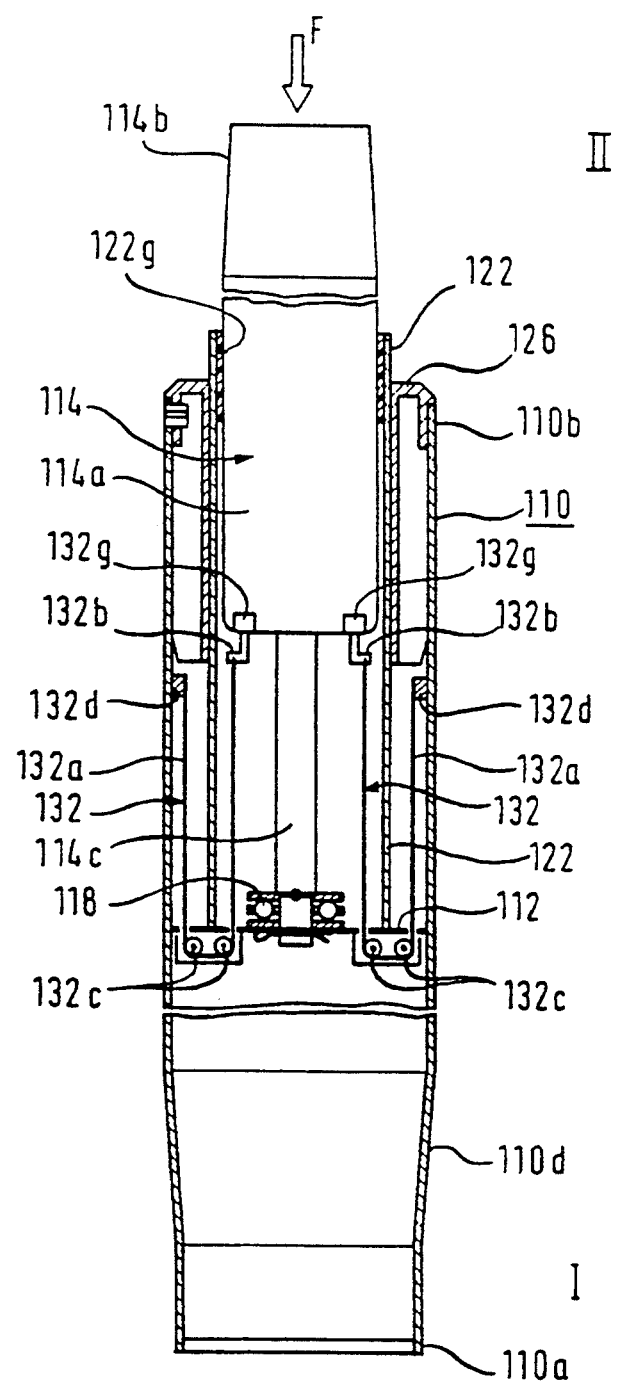
FIG. 3 shows a modified embodiment of a chair column.

In FIGS. 1 and 2, a base tube is designated by 10. This base tube has an axis A—A, a first end 10a and a second end 10b. A support plate 12 is fastened inside the base tube 10. A gas spring 14 is accommodated within the base tube 10. The gas spring 14 comprises a cylinder 14a with a conical fastening section 14b for fastening a seat carrier 16 thereon. A piston rod 14c is sealingly guided through the lower end portion of the cylinder 14a. The piston rod 14c is connected with a piston 14d inside the cylinder 14a. The piston 14d separates within the cylinder 14a two working chambers 14e and 14f from each other. Both working chambers 14e and 14f are filled with a pressurized gas. The working chambers 14e and 14f are interconnected by an annular bypass channel 14g via openings 14h and 14i. The bypass channel 14g can be opened and closed by a control valve member 14k through a control pin 14l. The piston rod 14c is by its lower end supported through an axial ball bearing 18 on the support plate 12. The lower end of the piston rod 14c is capable of limited lateral movement along arrow 20 with respect to the support plate 12. The cylinder 14a is guided by a guiding sleeve 22. This guiding sleeve 22 is centered by a centering tube 26. The centering tube 26 is non-rotatably mounted within the base tube 10, and the guiding sleeve 22 is non-rotatably but axially movably guided within the centering tube 26. The cylinder 14a is axially and rotatably guided in the guiding sleeve 22. An abutment ring 24 is fixed to the lower end of the cylinder 14a. This abutment ring 24 is accommodated within an annular recess 22a of the guiding sleeve 22. The guiding sleeve 22 is provided with a stop flange 22b at the upper end thereof for axial engagement with the centering tube 26. The cylinder 14a is provided with a further abutment ring 28 for engagement with an upper end face 22c of the guiding sleeve 22.

In FIG. 1, the column unit is in the lowest possible position. The axial position of the guiding sleeve 22 is defined by the stop flange 22b being located between the upper end of the centering tube 26 and the further abutment ring 28. When the control valve 14k is opened by axial force on the control pin 14l, the cylinder 14a moves upwards with respect to the piston rod 14c towards the position as shown in FIG. 2. By said upward movement of the cylinder 14a, the guiding sleeve 22 is moved upwards. This may be due to frictional engagement of the cylinder 14a with the guiding sleeve 22, if the frictional force existing between the cylinder 14a and the guiding sleeve 22 is larger than the friction force existing between the guiding sleeve 22 and the centering tube 26. But even if this is not true, the guiding sleeve 22 is moved upwards anyway, as soon as the abutment ring 24 engages the shoulder face 22e. Such, the guiding sleeve 22 arrives at the position as shown in FIG. 2 as soon as the piston rod 14c has arrived at its most outward position with respect to the cylinder 14a (as shown in FIG. 2). One can easily see from FIG. 2 that a perfect guiding function is still warranted in the position of FIG. 2 between the cylinder 14a and the base tube 10 through the guiding sleeve 22 in spite of the fact that the cylinder 14a is located at the upper end 10b of the base tube 10. One recognizes that an increased stroke of the gas spring 14 is possible for a given length of the cylinder 14a. The stroke corresponds substantially to the axial length of the cylinder 14a. For bringing the column from the position as shown in FIG. 2 to the position as shown in FIG. 1, it is necessary to open the control valve 14k again and to exert a downward directed force F onto the cylinder 14a. On downward movement of the cylinder 14a, the guiding sleeve 22 may be entrained by frictional force downwards as long as the frictional force between the cylinder 14a and the guiding sleeve 22 is greater than the frictional force between the guiding sleeve 22 and the centering tube 26. If this is not true, the guiding sleeve 22 is moved downward anyway as soon as the further abutment ring 28 engages the upper end face 22c of the guiding sleeve 22.

The guiding sleeve 22 can be injection-molded from plastics material.

Due to the flange 22b, an excessive downward movement of the guiding sleeve 22 is prevented.

The lower end of the stand tube 10 is provided with a conical section 10d for engagement with a conical hole of a chair base.

In the embodiment of FIG. 3, analagous parts are designated by the same reference numbers as in FIGS. 1 and 2 increased by 100.

In this embodiment, the support plate 112 is axially floating within the base tube 110. The guiding sleeve 122 is resting on the support plate 112. A plastic coating 122g is provided on the inner side of the guiding sleeve 122. A plurality of tackles 132 are provided. A tackle 132 comprises a rope or wire 132a, which runs from an anchoring hook 132b provided on the cylinder 114a downwards and via two pulleys 132c to an anchoring point 132d provided on the base tube 110. The ropes 132a may be elastically stretchable so that the gas spring 114 is movable downwards against elastic resistance and provides a spring effect for a seat plate. When the cylinder 114a moves upward with respect to the piston rod 114c by a length unit 1, the support plate 112 and the guiding sleeve 122 are moved upwards by a length unit ½. Such, the guiding sleeve 122 is again telescoped outwards for improving the guiding function between the cylinder 114a and the base tube 110 in the higher range of positions. On downward movement of the cylinder 114a by a downwardly acting force F, the support plate 112 and the guiding sleeve 122 are moved downwards again. The downward movement of the guiding sleeve 122 may be due to a positive connection of the guiding sleeve 122 with the support plate 112 or may be effected through friction of the cylinder 11a with the plastic coating 122g on the inner surface of the guiding sleeve 122.

The anchoring hook 132b may be provided on a ring member 132g which is rotatable with respect to the cylinder 114a so that rotation of the gas spring 114 is possible with respect to the base tube 110 without twisting the tackles 132. The support plate 112 may be non-rotatably guided with respect to the base tube 110. The ropes 132a remain tensioned under all conditions. The elasticity of the ropes 132a allows elastic downward movement of the gas spring 114 under an axial load F.

Instead of making the ropes 132a elastically stretchable, one may also provide an axially elastic mounting for the anchoring points 132d or 132b.

The gas spring 114 may have the same design as shown in FIG. 2.

Figure 4:
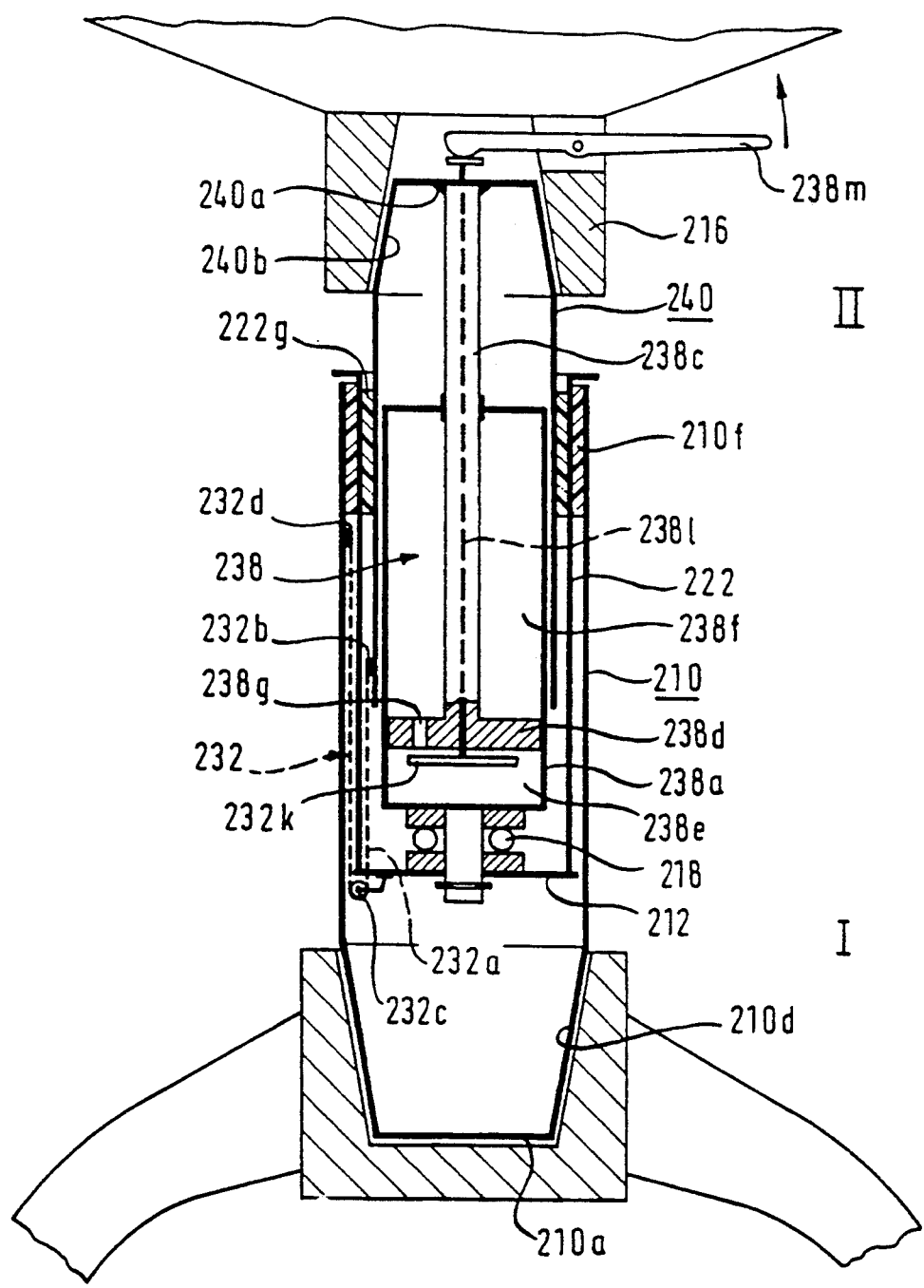
FIG. 4 shows a further modified embodiment of a chair column.

In the embodiment of FIG. 4, analogous parts are designated by the same reference numbers as in FIG. 1 increased by 200.

The gas spring of FIG. 4 is different from the gas spring in FIGS. 1 to 3 and is designated by 238. This gas spring comprises a cylinder 238a. A piston rod 238c extends through the upper end of the cylinder 238a. A piston 238d is fastened to the piston rod 238c inside the cylinder 238a and separates two working chambers 238e and 238f from each other. The working chambers 238e and 238f are interconnectable by a bore 238g through the piston 238d. The bore 238g can be opened and closed through a valve plate 238k, which is actuatable through an actuating rod 238l extending through a bore of the piston rod 238c. The actuating rod 238l is controlled by a control lever 238m rotatably mounted on the seat carrier 216. A guide tube 240 is fastened to the piston rod 238c at 240a. The guide tube 240 is provided with a conical section 240b adapted to the seat carrier. The guide tube 240 may be slidably guided on the cylinder 238a. Moreover, the guide tube 240 is axially guided on the inside of the guiding sleeve 222 through a plastic coating 222g of the guiding sleeve 222. The guiding sleeve 222 is guided on the inside of the base tube 210 through a plastic coating 210f. The lower end of the cylinder 238a is supported by the support plate 212 through the ball bearing 218. The support plate 212 may be connected with the guide tube 240. A tackle 232 is provided by a flexible rope 232a running from an anchoring point 232b on the guide tube 240 via a pulley 232c provided on the support plate 212 to a further anchoring point 232d provided on the base tube 210.

On upward movement of the piston rod 238c with respect to the cylinder 238a, for a length unit 1 the support plate 212 is lifted through the tackle 232 by a length unit ½. So, the guiding sleeve 222 is moved upwards, when the piston rod 238c and the guide tube 240 move upwards so that the guiding function is maintained even in the highest position of the column unit.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A chair column unit, comprising:
    a base tube, said base tube having a base tube axis (A—A), an axially inner base tube end and an axially outer base tube end;
    tubular guiding means extending axially into said base tube through said outer base tube end and including a radially outer face in axially sliding engagement therewith, said guiding means having an axially inner end and an axially outer end;
    a pressurized gas spring positioning device extending axially into said base tube through said guiding means and having a device axis substantially coinciding with said base tube axis (A—A);
    said positioning device including an axially inwardly extending piston rod member, an axially outwardly extending cylinder member, said piston rod member and said cylinder member being axially movable with respect to each other due to the force of said pressurized gas, and means for selectively locking said piston rod member and said cylinder member with respect to each other in a plurality of relative axial positions;
    positioning device support means carried by one of said base tube and said guiding means adjacent the respective axially inner end thereof for axially supporting the inner end of said piston rod member while permitting relative rotation between said piston rod member and said base tube;
    said cylinder member extending axially beyond said outer base tube end and said outer guiding means end and carrying means adjacent the axially outer end thereof for connection to a chair seat carrier;
    said cylinder member carrying a radially outer face in axially sliding guiding engagement with said guiding means; and means for moving said guiding means axially relative to said base tube upon axial movement of said cylinder member relative to said piston rod member in at least the axially outward direction so as to maintain said guiding means in overlapping relation to at least a substantial axial portion of said cylinder member.

2. A chair column unit as set forth in claim 1, wherein:
said cylinder member is movable, upon release of said locking means, between a maximum axially inner position relative to said base tube and a maximum axially outer position relative to said base tube; and
the axially inner end of said cylinder member, when said cylinder member is at said maximum axially outer position, is substantially axially adjacent to the axially outer end of said base tube.

3. The chair column unit as set forth in claim 2, wherein the axially outer end of said guiding means, when said cylinder member is at said maximum axially inner position, is substantially axially adjacent to the axially outer end of said base tube.

4. The chair column unit as set forth in claim 2, wherein said guiding means, when said cylinder member is at said maximum axially outer position, overlaps both a substantial axially outer portion of said base tube and a substantial axially inner portion of said cylinder member.

5. The chair column as set forth in claim 1, wherein said means for moving said guiding means axially relative to said base tube includes means for moving said guiding means in the axially inward direction upon movement of said cylinder member in the axially inward direction relative to said piston rod member.

6. The chair column unit as set forth in claim 1, wherein said means for moving said guiding means axially relative to said base tube includes means for entraining said guiding means in both axial directions of movement of said cylinder member.

7. The chair column unit as set forth in claim 1, wherein, with said base tube axis (A—A) substantially vertical and said axially outer base tube end directed upward, said guiding means is movable axially inward by gravity.

8. The chair column unit as set forth in claim 1, wherein said means for moving said guiding means axially relative to said base tube comprises means carried in part by said cylinder member and in part by said guiding means for entraining said guiding means upon movement of said cylinder member axially outward of said base tube.

9. The chair column unit as set forth in claim 8, wherein said entraining means comprises a first, axially-inwardly directed abutment face carried by said guiding means and a second, axially-outwardly directed abutment face carried by said cylinder member.

10. The chair column unit as set forth in claim 9, wherein said first and second abutment faces are axially spaced from one another when said cylinder member is fully retracted into said base tube and come into engagement with each other to entrain said guiding means upon axially outward movement of said cylinder member.

11. The chair column unit as set forth in claim 1, wherein said means for moving said guiding means axially relative to said base tube is operable to move said guiding means in at least one axial direction by frictional engagement of said cylinder member with said guiding means.

12. The chair column unit as set forth in claim 1, wherein said means for moving said guiding means axially relative to said base tube includes mutually engagement abutment means carried in part by said cylinder member and in part by said guiding means for moving said guiding means in at least one axial direction.

13. The chair column unit of claim 12, wherein said means for moving said guiding means axially relative to said base tube includes mutually engageable abutment means carried in part by said cylinder member and in part by said guiding means for moving said guiding means in both axial directions.

14. The chair column unit as set forth in claim 1, wherein said means for moving said guiding means in said at least said one direction includes:
an axially extending annular recess formed in the radially inner wall of said guiding means and defining an axially inwardly directed end face; and
an abutment ring carried by said cylinder member adjacent the axially inner end thereof, said abutment ring being received axially within said annular recess and, upon outward movement of said cylinder member relative to said piston rod member, engaging said end face to move said guiding means in the axially outward direction.

15. The chair column unit according to claim 5, wherein said means for moving said guiding means in the axially inward direction includes abutment means carried by said cylinder member adjacent the axially outer end thereof for engaging the axially outer end of said guiding means upon axially inward movement of said cylinder member.

16. The chair column unit of claim 15, wherein said abutment means comprises an abutment ring on the cylinder member or a surface on a chair support carrier carried by the cylinder member.

17. The chair column unit as set forth in claim 15, wherein said abutment means is provided by a column-guided object fastened to said cylinder member.

18. The chair column unit as set forth in claim 1, wherein said base tube includes a centering tube for centering said guiding means within said base tube.

19. The chair column unit as set forth in claim 18, wherein said centering tube is fixed against rotation relative to said base tube.

20. The chair column unit as set forth in claim 1, wherein said guiding means is fixed against rotation relative to said base tube.

21. The chair column unit as set forth in claim 1, wherein said guiding means and said base tube include mutually engageable stop faces limiting axially inward movement of said guiding means relative to said base tube.

22. The chair column unit as set forth in claim 1, wherein said guiding means is at least partially made of a plastics material.

23. The chair column unit as set forth in claim 1, wherein said positioning device support means is provided inside said base tube.

24. The chair column unit as set forth in claim 1, wherein said selectively locking means comprises locking control means located at the axially outer end of said cylinder member.

25. The chair column unit as set forth in claim 1, wherein said positioning device support means is axially fixed with respect to said base tube.

26. The chair column unit as set forth in claim 1, wherein said positioning device support means is axially movable with respect to said base tube.

27. The chair column unit as set forth in claim 26, wherein:
said positioning device support means is carried by said guiding means adjacent the axially inner end thereof; and
said column unit further comprises means for axially moving said positioning device support means with respect to said base tube in response to axial movement of said cylinder member relative to said piston rod member.

28. The chair column unit as set forth in claim 27, wherein said means for axially moving said positioning device support means comprises tackle means.

29. The chair column unit as set forth in claim 26, wherein said positioning device support means is movable with respect to said base tube against elastic resistance in response to an axial load on said positioning device.

30. The column unit as set forth in claim 28, wherein said tackle means comprises at least one flexible tension member running from a first anchoring point of said cylinder member via at least one pulley mounted on said positioning device support means to a second anchoring point on said base tube, said guiding means being axially movable together with said positioning device support means.

31. The chair column unit as set forth in claim 28, wherein said positioning device is rotatable about said base tube axis (A-A) with respect to said positioning device support means and with respect to said tackle means.

32. The chair column unit as set forth in claim 30, wherein said first anchoring point is rotatable with respect to said cylinder member about said base tube axis (A—A).

33. The chair column unit as set forth in claim 28, wherein said tackle means comprises at least one elastically stretchable flexible tension member.

34. The chair column unit as set forth in claim 28, wherein said tackle means comprises a flexible tension member having at least one end axially fixed to an elastically displaceable anchoring point.

35. The chair column unit as set forth in claim 1, wherein said cylinder member is rotatable relative to said guiding means.

36. The chair column as set forth in claim 1, wherein said guiding means is axially entrainable, upon outward movement of said cylinder member, solely by entraining engagement with said cylinder member or a component carried thereby.

37. The chair column unit as set forth in claim 18, wherein said centering tube is located adjacent the axially outer end of said base tube.

38. A chair column unit as set forth in claim 37, wherein:
said cylinder member is movable, upon release of said locking means, between a maximum axially inner position relative to said base tube and a maximum axially outer position relative to said base tube;
said guiding means, when said cylinder member is at said maximum axially outer position, overlaps both a substantial axially outer portion of said centering tube and a substantial axially inner portion of said cylinder member; and
said means for moving said guiding means axially relative to said base tube upon axially outward movement of the cylinder member permits said guiding means to remain in overlapping relation to a substantial axial portion of said centering tube in all axial positions of said cylinder member relative to said base tube.

* * * * *

UNITED STATES PATENT AND TRADEMARK OFFICE
CERTIFICATE OF CORRECTION

PATENT NO. : 5,377,942
DATED : January 3, 1995
INVENTOR(S) : Axel Knopp et al.

It is certified that error appears in the above-indentified patent and that said Letters Patent is hereby corrected as shown below:

Col. 7, line 8, "analagous" should read --analogous--;
Col. 8, line 3, "carrier" should read --carrier 216.--;
Col. 10, lines 5-6, "engagement" should read --engageable--;
Col. 10, line 17, delete "said" (2nd occurrence);
Col. 12, line 13, "column" should read --column unit--.

Signed and Sealed this

Thirtieth Day of May, 1995

BRUCE LEHMAN

Attest:

Attesting Officer

Commissioner of Patents and Trademarks